US008483522B2

(12) United States Patent
Heidrich et al.

(10) Patent No.: US 8,483,522 B2
(45) Date of Patent: Jul. 9, 2013

(54) OPTICAL MODULATOR, INTEGRATED OPTICAL CIRCUIT, AND METHOD FOR MODULATING AN OPTICAL SIGNAL

(75) Inventors: Helmut Heidrich, Berlin (DE); Peter Luetzow, Berlin (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 105 days.

(21) Appl. No.: 13/120,544

(22) PCT Filed: Sep. 23, 2009

(86) PCT No.: PCT/EP2009/007049
§ 371 (c)(1),
(2), (4) Date: Aug. 30, 2011

(87) PCT Pub. No.: WO2010/034522
PCT Pub. Date: Apr. 1, 2010

(65) Prior Publication Data
US 2011/0305413 A1     Dec. 15, 2011

(30) Foreign Application Priority Data
Sep. 24, 2008  (DE) ................. 10 2008 049 164

(51) Int. Cl.
  *G02F 1/295*   (2006.01)
  *G02F 1/035*   (2006.01)
(52) U.S. Cl.
  USPC .................. 385/5; 385/2; 385/8; 385/14
(58) Field of Classification Search
  USPC ..................... 385/2, 5, 8, 9, 14, 25
  See application file for complete search history.

(56) References Cited

U.S. PATENT DOCUMENTS

| 4,204,742 | A | 5/1980 | Johnson et al. |
| 5,787,212 | A | 7/1998 | Hong et al. |
| 6,385,363 | B1 * | 5/2002 | Rajic et al. ............... 385/16 |
| 6,987,898 | B2 * | 1/2006 | Tran et al. ................ 385/13 |
| 7,215,869 | B2 * | 5/2007 | Lee et al. ................. 385/140 |
| 2002/0039467 | A1 | 4/2002 | Amantea |

FOREIGN PATENT DOCUMENTS
WO    WO-00/58770 A1    10/2000

OTHER PUBLICATIONS

"International Application No. PCT/EP2009/007049, International Search Report and Written Opinion mailed Dec. 4, 2009", 16 pgs.

Baglio, S., et al., "P1-18: Novel Microactuators based on a Photo-Thermo-Mechanical Actuation Strategy", Proceedings of IEEE Sensors 2002, vol. 1, (Jun. 12, 2002), 192-197.

(Continued)

*Primary Examiner* — Daniel Petkovsek
(74) *Attorney, Agent, or Firm* — Schwegman Lundberg & Woessner, P.A.

(57) ABSTRACT

The invention relates to an optical modulator, comprising a first waveguide for a signal to be modulated, a second waveguide for a control signal, and an auxiliary waveguide, wherein the auxiliary waveguide is supported by a carrier which can be deflected to change a distance between the first waveguide and the auxiliary waveguide, wherein the carrier also comprises two layers with different coefficients of thermal expansion and the second waveguide is guided in such a way that a temperature of the carrier at least in a section can be manipulated by light transported by the second waveguide. The invention further relates to an integrated optical circuit comprising such an optical modulator, and to a modulation method which can be performed with such a modulator.

18 Claims, 2 Drawing Sheets

OTHER PUBLICATIONS

Han, Li-Hsin, et al., "Wireless bimorph micro-actuators by pulsed laser heating", Sensors and Actuators, vol. 121, No. 1, (May 31, 2005), 35-43.

Higo, Akio, et al., "Design and Fabrication of Photonic MEMS Waveguide Modulators", Optical MEMS and Nanophotonics, 2007 IEEE/LEOS International Conference, (Aug. 1, 2007), 173-174.

* cited by examiner

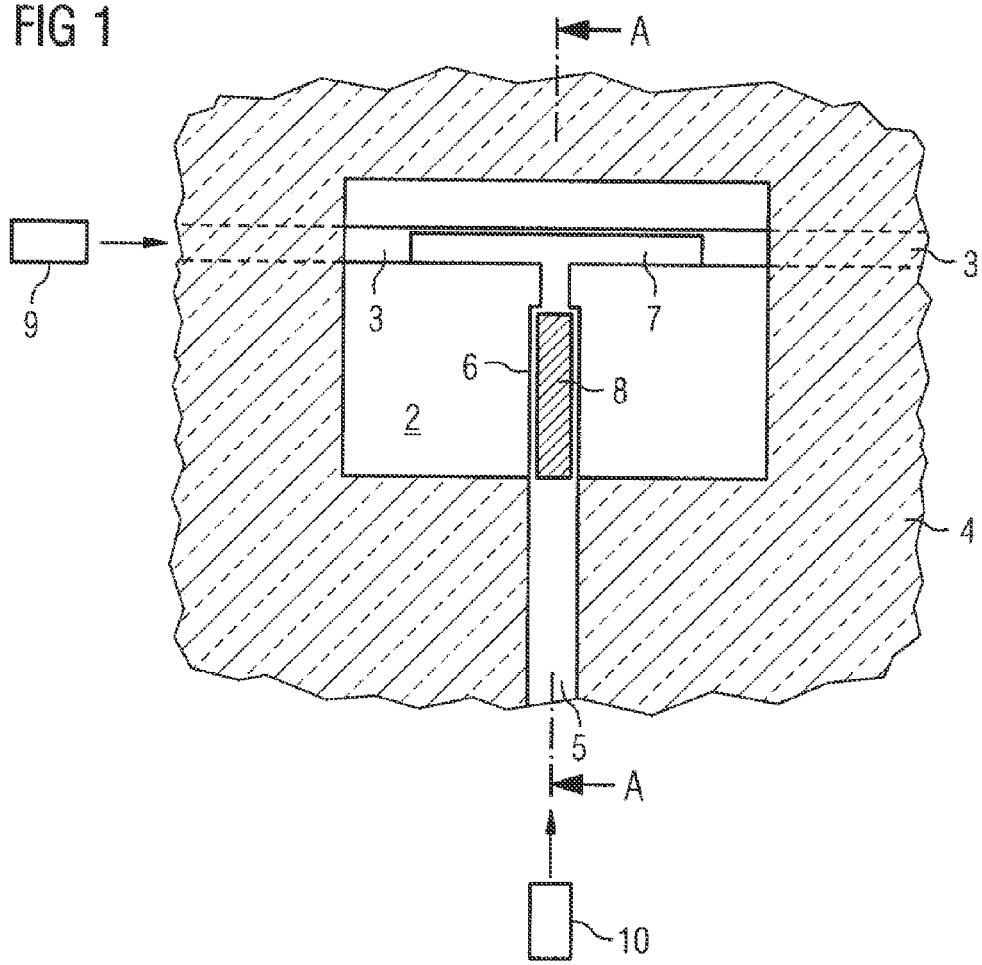
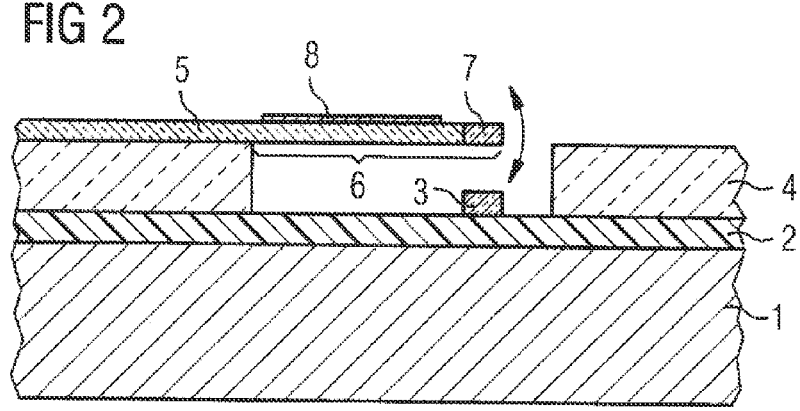

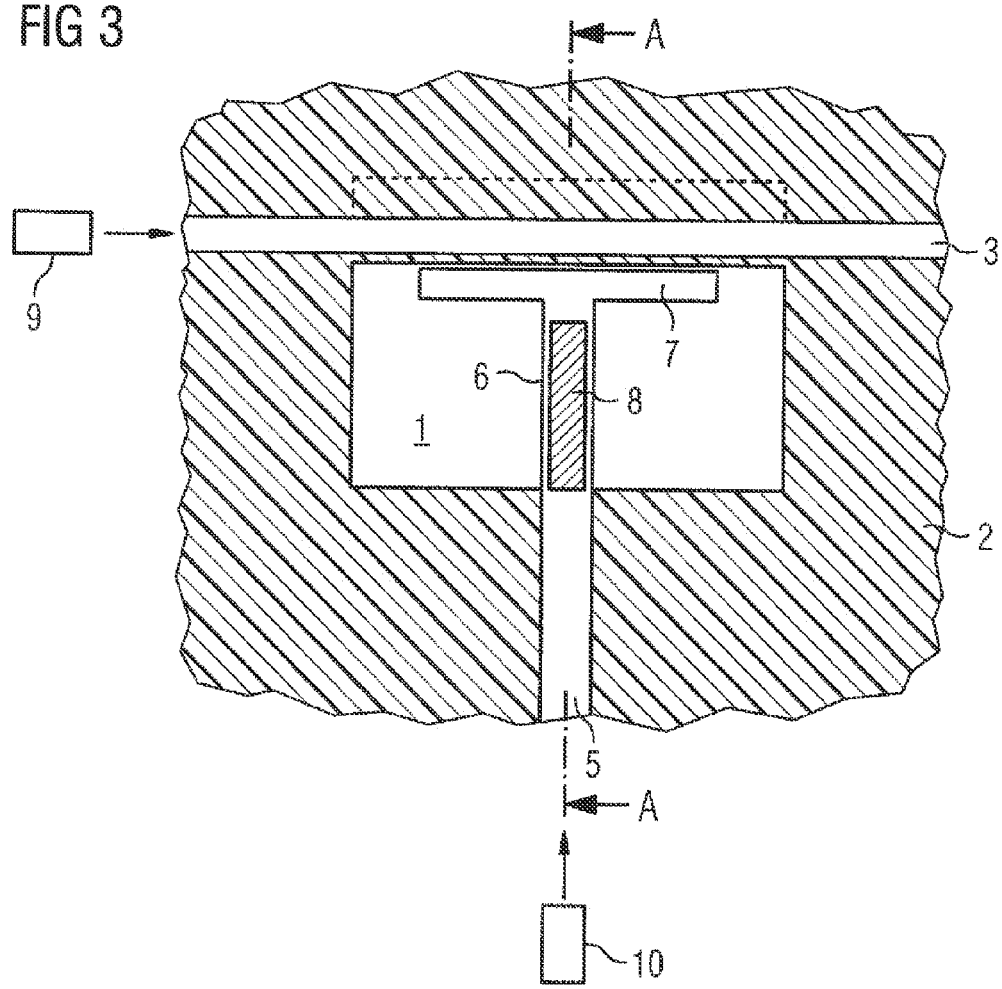
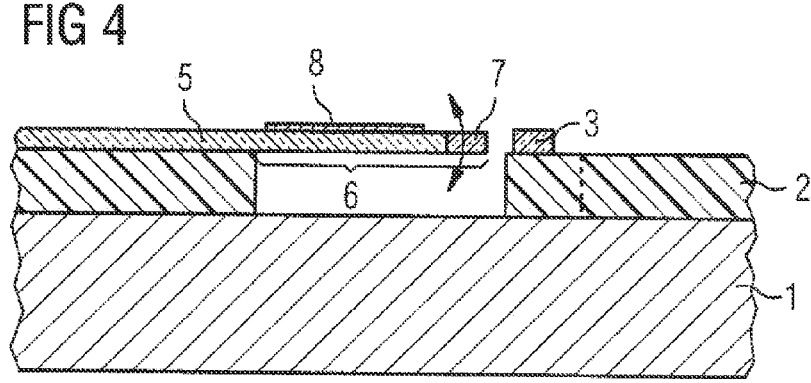

OPTICAL MODULATOR, INTEGRATED OPTICAL CIRCUIT, AND METHOD FOR MODULATING AN OPTICAL SIGNAL

PRIORITY CLAIM TO RELATED APPLICATIONS

This application is a national stage application under 35 U.S.C. §371 of PCT/EP2009/007049, filed Sep. 23, 2009, and published as WO 2010/034522 A1 on Apr. 1, 2010, which claims priority to German Application No. 10 2008 049 164.0, filed Sep. 24, 2008, which applications and publication are incorporated herein by reference and made a part hereof in their entirety, and the benefit of priority of each of which is claimed herein.

The invention relates to an optical modulator which can e.g. be used as an optical switch, to an integrated-optical circuit which includes such an optical modulator, and to a method for modulating an optical signal by means of such a modulator.

To implement circuits which operate purely optically and in so doing show a certain circuit complexity, it is necessary to control a course of a light signal in dependence on another light signal. No satisfactory solutions for this have been known to date.

It is therefore the object of the invention to develop an apparatus with which a light signal can be controlled in dependence on another light signal, wherein the apparatus should be able to be manufactured with as little effort as possible, should be reliable and should also be suitable for use in very compact optical circuits. It is furthermore the object of the invention to propose a corresponding method for modulating a light signal.

This object is achieved in accordance with the invention by an optical modulator having the features of the main claim and by an integrated-optical circuit in accordance with claim 16 which includes such an optical modulator, as well as by a method having the features of claim 18. Advantageous embodiments and further developments of the invention result from the features of the dependent claims.

The invention provides that the optical modulator includes a first waveguide for a signal to be modulated, a second waveguide for a control signal and an auxiliary waveguide, wherein the auxiliary waveguide is carried by a carrier which can be deflected to change a coupling between the first waveguide and the auxiliary waveguide, wherein the carrier furthermore includes two layers of different coefficients of thermal expansion and the second waveguide is performed in such a way that a temperature of the carrier can be manipulated at least in a partial region by light transported by the second waveguide. The carrier, which is preferably configured in the form of an extension or cantilever, can thus be photothermally deformed on the basis of a bimetallic effect in dependence on the optical control signal which is transported by the second waveguide. The optical coupling between the first waveguide and the auxiliary waveguide thus changes—typically decreases with increasing distance—which in turn results in a corresponding modulation of a transmission property of the first waveguide and thus in a modulation of the signal transported by this first waveguide. Since the optical coupling between the first waveguide and the auxiliary waveguide depends to a very sensitive degree on the spacing which is a function of the control signal so that the signal to be modulated can, in dependence on the then current value of this spacing, be decoupled e.g. almost completely from the first waveguide and into the auxiliary waveguide or—possibly after multiple forward/backward coupling sequences—can pass the first waveguide almost unhindered, the proposed optical modulator is e.g. suitable for the optical switching of the signal transported in the first waveguide or for a very effective amplification of a time dependence of the control signal. In this respect, this optical modulator has a very simple structure, can accordingly be manufactured very simply, and demonstrates an advantageously high reliability.

To achieve a deflection of the carrier which depends on a heating of the carrier caused by the control signal and which is as clear as possible, it is of advantage if the two named layers of the carrier have coefficients of thermal expansion differing by a factor of at least 1.5, preferably by a factor of at least 2. This results in a correspondingly pronounced bimetallic effect on the basis of which the carrier can bend to change the spacing between the first waveguide and the auxiliary waveguide.

A particularly simple and reliable structure of the optical modulator results when a light-absorbing section of the second waveguide is formed by a part of the carrier or is carried by the carrier. The named section of the second waveguide can carry a coating which effects an increased absorption of light transported in the second waveguide in this section in order to achieve that the temperature of the carrier or of a part of the carrier can be effectively controlled in dependence on the control signal. This coating can be one of the two named layers of different coefficients of thermal expansion. The desired bimetallic effect with a simultaneously increased absorption in the corresponding section of the second waveguide can be implemented, for example, in that the named coating consists of gold or another metal. In this respect, the coating can e.g. be designed with a layer thickness of between 10 nm and 100 nm.

The light transported in the first waveguide can then be modulated particularly easily by a spacing-dependent coupling between the first waveguide and the auxiliary waveguide when the auxiliary waveguide extends at least along a coupling path parallel to the first waveguide. This coupling path can e.g. have a length between 0.1 mm and 1 mm so that the optical modulator on the one hand keeps at compact dimensions and, on the other hand, a sufficiently strong coupling between the first waveguide and the auxiliary waveguide is achieved which is caused by an overlap of evanescent fields. Depending on the length of the auxiliary waveguide or of the coupling path, the optical modulator can be designed in this respect so that the first waveguide and the auxiliary waveguide have a spacing or a smallest spacing of between 0.1 μm and 2 μm when the carrier is in its position of rest. The coupling between the first waveguide and the auxiliary waveguide is therefore preferably a so-called evanescent coupling which is caused by a cross-talk of evanescent fields. An advantageous high sensitivity of the light exiting the modulator in the first waveguide to spacing changes between the first waveguide and the auxiliary waveguide caused by deflection of the carrier is thereby achieved. This in particular applies when the coupling path along which the first waveguide and the auxiliary waveguide extend at a close spacing next to each other is so long that it spans a multiple of a coupling length, wherein the coupling length is designated as the smallest length at which—with a given spacing between the waveguides—a light portion overcouples which is as large as possible.

A simple structure of the optical modulator results when the auxiliary waveguide extends, at least in the coupling path, perpendicular to the absorbing section of the second waveguide which is formed by a part of the carrier or is held by the carrier and which typically forms an end of the second waveguide.

To allow a fast modulation of the light transported by the first waveguide with a sufficient modulation depth, the carrier typically realised as a cantilever can be configured, for example, with a length of between 30 μm and 500 μm. In particular when the length of the carrier lies in this range, the carrier can expediently have a thickness of between 0.1 μm and 1 μm in order to be sufficiently stable on one hand and, on the other hand, to be able to be deflected sufficiently easily.

A preferable embodiment of the optical modulator provides that it is implemented on the basis of a substrate which can be a semiconductor substrate formed, for example, by a wafer and a part of a wafer. This substrate can carry two waveguide layers respectively separated from each other and from the substrate by a separation layer acting as an optical buffer. The waveguide layers can in this respect be structured so that they form waveguide cores of the waveguides. The waveguide layers can in this respect also in each case, in addition to a waveguide core of the corresponding waveguide, include one or more layers which carry the waveguide core. Instead of an embodiment having two waveguide layers which are separated from each other by a separating layer and of which typically one includes or forms the first waveguide, whereas the other includes or forms the second waveguide and the auxiliary waveguide, an arrangement can also be selected in which the first waveguide, the second waveguide and the auxiliary waveguide are implemented in a single waveguide layer. The substrate can, for example, be formed from silicon. A semiconductor such as silicon is also suitable for the fabrication of the waveguide layer or of at least one of the waveguide layers due to its good structural capability and material properties. Alternatively, a polymer or another dielectric can also be used to form the substrate and/or at least one of the waveguide layers. Provided that a waveguide layer is formed from a polymer, a waveguide core of the corresponding waveguide from a different material can be placed into this polymer.

The separating layer, which is formed, for example, from $SiO_2$ and which separates the waveguide layers from each other or at least one waveguide layer from the substrate, can be removed in a vicinity of the carrier, which in this case includes a part of the waveguide layer or one of the waveguide layers or is formed by a part of the waveguide layer or by one of the waveguide layers, to ensure a deflection capability of the carrier. The corresponding part of the separating layer can be etched off for this purpose.

The two waveguides or the auxiliary waveguide can each be configured as a ridge waveguide/ridge waveguides. Instead, the respective waveguide layer or that layer which forms a waveguide core of the corresponding waveguide can also be completely removed in a vicinity of the waveguide so that only the waveguide itself remains of this layer.

An optical modulator of the described kind is in particular suitable to form a part of a more complex integrated-optical circuit which is expediently implemented completely or partly on the same substrate as the optical modulator.

An optical signal can be modulated in an advantageous manner by an optical control signal using the described modulator or the integrated-optical circuit including such a modulator in that light to be modulated is coupled into the first waveguide so that it propagates through the first waveguide in the longitudinal direction, whereas a time-dependent light signal serving as a control signal is coupled into the second waveguide so that it propagates through the second waveguide in the longitudinal direction, wherein the carrier of the auxiliary waveguide is deflected by the time-dependent light signal and the light coupled into the first waveguide is thereby modulated. In this respect, a light source which is optically coupled to the first waveguide and which is arranged so that light emitted from this light source propagates through the first waveguide in the longitudinal direction can be used in order to couple the light to be modulated into the first waveguide. The control signal can accordingly be coupled into the second waveguide by a light source which is optically coupled with the second waveguide and which is arranged so that light emerging from this light source propagates in the longitudinal direction through the second waveguide, which it can reach directly or naturally also in a circuitous manner.

Embodiments of the invention will be explained in the following with reference to FIGS. 1 to 4. There are shown FIG. 1 a plan view of an optical modulator in an embodiment of the invention;

FIG. 2 a cross-section through the optical modulator of FIG. 1 at a point designated by A-A there;

FIG. 3 a plan view of another embodiment for an optical modulator of the proposed kind; and FIG. 4 a cross-section through the optical modulator of FIG. 3 at a point designated there by A-A.

The optical modulator from FIGS. 1 and 2 is implemented on the basis of a substrate 1 which is formed by a part of a silicon wafer. This optical modulator can be part of a more complex integrated-optical circuit which includes further optical components realized on the same substrate 1.

A separating layer 2 which serves as an optical buffer and is formed from $SiO_2$ is arranged on the substrate 1. In a modification of the described embodiment, the separating layer 2 can also be formed from a polymer.

A first waveguide 3 for an optical signal to be modulated is conducted over the separating layer 2. This first waveguide 3 is formed from a waveguide layer of silicon which is completely or almost completely etched away by a corresponding structuring in a vicinity of the first waveguide 3 and of possibly provided further waveguides of the integrated-optical circuit. Instead of silicon, another material having a sufficiently high refractive index such as $SiN_x$, a polymer or a waveguide core embedded in a polymer can naturally also serve to form the first waveguide 3.

A further separating layer 4 is arranged above the separating layer 2, said further separating layer likewise being formed from $SiO_2$ and covering the first waveguide 3, and at least regionally, other regions of the corresponding waveguide layer. The further separating layer 4 could instead be formed e.g. from a polymer. The separating layer 4, which likewise acts as an optical buffer, separates the waveguide layer forming the first waveguide 3 from a second waveguide 5 which is likewise formed from silicon in the present embodiment and serves for conducting an optical control signal and can be modulated in dependence on the signal conducted in the first waveguide 3. The second waveguide 5 could instead also be formed from another material, for example from $SiN_x$ or by a waveguide core embedded in a polymer.

A last section of the second waveguide 5 opens into an extension 6 which can also be called a cantilever and which carries an auxiliary waveguide 7, wherein the auxiliary waveguide 7 extends perpendicular to the named section of the second waveguide 5 and parallel to the first waveguide 3. In this respect, the auxiliary waveguide 7 is formed from the same material as the second waveguide 5 with which it is formed from a common waveguide layer.

The auxiliary waveguide 7 has a length of between 0.2 and 0.5 mm and is located at a spacing of approximately 1 μm from the first waveguide 3 when the cantilever 6 is located in a tension-free position of rest. The cantilever 6 which has a length of between 50 μm and 100 μm and a thickness of approximately 0.5 μm can be deflected or bent away from the said position of rest in a manner which is illustrated by a double arrow in FIG. 2. In this respect, the spacing between the auxiliary waveguide 7 and the first waveguide 3 changes by a deflection of the cantilever 6. This deflection can be controlled by the control signal transported in the second waveguide 5. For this purpose, an approximately 50 nm thick coating 8 of gold is placed on the second waveguide 5 in the region of the cantilever 6. This coating has not only a significantly different coefficient of thermal expansion to the second waveguide 5, but also effects a considerable absorption of the light transported in the second waveguide 5 in its last section which forms a part of the cantilever 6. This has the consequence that a temperature of the cantilever 6 can be controlled at least in a vicinity of the coating 8 by the light transported by the second waveguide 5, wherein the deflection of the cantilever 6 is in turn controlled by this temperature in that the cantilever 6 bends due to a bimetallic effect which originates from the different coefficients of thermal expansion of the second waveguide and of the coating 8. To enable such a bending of the cantilever 6, the separating layer 4 is etched away in a vicinity of the cantilever 6 so that the first waveguide 3 is also exposed in a vicinity of the auxiliary waveguide 7.

Due to the small spacing between the first waveguide 3 and the auxiliary waveguide 7, the evanescent fields of the first waveguide 3 and of the auxiliary waveguide 7 overlap so that an optical coupling is present between the two whose strength has a sensitive dependence on the exact value of the named spacing. Since this spacing in turn depends on an intensity of the light transported in the second waveguide 5, the described optical modulator allows a modulation of the light transported in the first waveguide 3 in dependence on the control signal which is fed into the second waveguide 5. In this manner, the optical modulator can e.g. be used as an optical switch or for the variable attenuation, for example to amplify a time dependence of optical signals.

A similar optical modulator is shown in FIGS. 3 and 4 which operates in the same manner, with corresponding features again being provided with the same reference numerals and no longer being explained in detail. Differences to the previously described embodiment only result in that here both waveguides 3 and 5 are conducted in a single plane so that the first waveguide 3 for the signal to be modulated and the auxiliary waveguide 7 carried by the cantilever 6 do not extend over one another, but rather next to one another. Accordingly, in the optical modulator shown in FIGS. 3 and 4, only a single separating layer 2 is provided which separates the substrate 1 from a waveguide layer in which both the first waveguide 3 and the second waveguide 5 for the control signal and the auxiliary waveguide 7 are implemented. The separation layer 2 is omitted in a vicinity of the cantilever 6 to allow its deflection. It is indicated by the dotted line in FIGS. 3 and 4 that the separating layer 2 can alternatively also be omitted in a larger region so that the first waveguide 3 extends in a freely floating manner in a vicinity of the auxiliary waveguide 7 which defines a coupling path.

In modifications of the optical modulators shown in the Figures, the cantilever 6 can also have two arms which engage at respective ends of the auxiliary waveguide 7 so that the auxiliary waveguide 7 is not disturbed by a centrally engaging end of the second waveguide 5. The second waveguide 5 could for this purpose e.g. be forked by means of a Y coupler or could be configured with a fork only arranged behind the absorbing section with the coating 8.

The proposed measures allow a switching or modulating of light signals in integrated-optical circuits by control light signals while utilizing photo-thermal bending of cantilever structures. For this purpose, a control light signal is conducted by means of the second waveguide 5 onto a cantilever formed by the cantilever 6. This cantilever, instead of which another movable micromechanical structure can also be used, is coated or finished so that the control light signal is considerably absorbed. The control light signal is thereby converted into heat and results in a bending of the cantilever. A waveguide part which is fastened to the free end of the cantilever, preferably perpendicular thereto, and which has here been called an auxiliary waveguide 7, thereby approaches the first waveguide 3 or is withdrawn therefrom in dependence on a deflection state of the cantilever photothermally induced in the described manner. A light signal conducted in the first waveguide 3 in this respect couples with the waveguide piece which forms the auxiliary waveguide 7. By changing the coupling distance between the auxiliary waveguide 7 and the first waveguide 3, the light signal conducted in the first waveguide 3 can be variably attenuated or also completely decoupled therefrom depending on the degree of the photothermally induced bending of the cantilever.

The light signal thus modulated is for this purpose coupled into the first waveguide 3 by a first light source only shown schematically in FIGS. 1 and 3 so that said light signal propagates through the first waveguide 3 in the longitudinal direction. The time-dependent control light signal is coupled into the second waveguide 5 by a second light source 10 likewise only shown schematically so that it propagates through the second waveguide 5 in the longitudinal direction. The carrier of the auxiliary waveguide 7 is in this respect deflected by the time-dependent control light signal so that the light signal coupled into the first waveguide 3, which light signal can initially be light constant in time, is thereby modulated and exits the modulator with a corresponding time dependence at an end of the first waveguide 3 remote from the first light source 9.

The light sources 9 and 10 can e.g. be light-emitting diodes or laser light sources, in particular laser diodes. These light sources 9 and 10 can in this respect be components of the modulator or of the integrated-optical circuit including the modulator.

What is claimed is:

1. An optical modulator, comprising:
   a first waveguide for a signal to be modulated,
   a second waveguide for a control signal and
   an auxiliary waveguide, wherein the auxiliary waveguide is held by a carrier which can be deflected to change a coupling between the first waveguide and the auxiliary waveguide, wherein the carrier furthermore includes two layers of different coefficients of thermal expansion and the second waveguide is conducted in such a way that a temperature of the carrier can be manipulated at least in a partial region by light transported by the second waveguide.

2. The optical modulator according to claim 1, wherein it has a light source optically connected to the second waveguide for coupling the optical control signal into the second waveguide.

3. The optical modulator according to claim 1, wherein the carrier is provided by a boom.

4. The optical modulator according to claim 1, wherein a light absorbing section of the second waveguide is formed by a part of the carrier or is carried by the carrier.

5. The optical modulator according to claim 4, wherein the auxiliary waveguide extends perpendicular to the named section of the second waveguide at least in parts.

6. The optical modulator according to claim 4, wherein light absorbing section of the second waveguide carries a coating which effects an increased absorption of light transported in the second waveguide in this section.

7. The optical waveguide according to claim 6, wherein the coating forms one of the two layers of different coefficients of thermal expansion.

8. The optical modulator according to claim 6, wherein the coating is formed from gold or from a different metal and/or has a thickness of between 10 nm and 100 nm.

9. The optical modulator according to claim 1, wherein it is implemented on the basis of a substrate which carries two waveguide layers separated from one another and from the substrate by a respective separating layer.

10. The optical modulator according to claim 9, wherein the substrate and/or at least one of the waveguide layers is formed from a semiconductor or from a dielectric.

11. The optical modulator according to claim 9, wherein the separating layer is removed in a vicinity of the carrier including a part of one of the waveguide layers or formed by a part of one of the waveguide layers.

12. The optical modulator according to claim 1, wherein the auxiliary waveguide extends parallel to the first waveguide at least along a coupling path.

13. The optical modulator according to claim 12, wherein the coupling path has a length of between 0.1 mm and 1 mm.

14. The optical modulator according to claim 1, wherein the first waveguide and the auxiliary waveguide have a spacing of between 0.1 μm and 2 μm in a position of rest of the carrier.

15. The optical modulator according to claim 1, wherein the carrier has a length of between 30 μm and 500 μm and/or a thickness of between 0.1 μm and 1 μm.

16. An integrated-optical circuit, comprising:
an optical modulator including a first waveguide for a signal to be modulated,
a second waveguide for a control signal, and
an auxiliary waveguide, wherein the auxiliary waveguide is held by a carrier which can be deflected to change a coupling between the first waveguide and the auxiliary waveguide, wherein the carrier furthermore includes two layers of different coefficients of thermal expansion and the second waveguide is conducted in such a way that a temperature of the carrier can be manipulated at least in a partial region by light transported by the second waveguide.

17. The integrated-optical circuit according to claim 16, wherein it includes a light source optically connected to the first waveguide for coupling light to be modulated into the first waveguide and/or a light source optically connected to the second waveguide for coupling the optical control signal into the second waveguide.

18. A method for modulating an optical signal comprising:
providing a first waveguide for a signal to be modulated, a second waveguide for a control signal and an auxiliary waveguide, wherein the auxiliary waveguide is held by a carrier which can be deflected to change a coupling between the first waveguide and the auxiliary waveguide, wherein the carrier furthermore includes two layers of different coefficients of thermal expansion and the second waveguide is conducted in such a way that a temperature of the carrier can be manipulated at least in a partial region by light transported by the second waveguide; and
coupling light to be modulated into the first waveguide so that it propagates through the first waveguide in the longitudinal direction, and coupling a time-dependent light signal serving as a control signal into the second waveguide so that it propagates through the second waveguide in the longitudinal direction, wherein the carrier of the auxiliary waveguide is deflected by the time-dependent light signal and the light coupled into the first waveguide is thereby modulated.

* * * * *

UNITED STATES PATENT AND TRADEMARK OFFICE
CERTIFICATE OF CORRECTION

PATENT NO. : 8,483,522 B2  
APPLICATION NO. : 13/120544  
DATED : July 9, 2013  
INVENTOR(S) : Heidrich et al.

Page 1 of 1

It is certified that error appears in the above-identified patent and that said Letters Patent is hereby corrected as shown below:

In the Claims:
In column 6, line 46, in Claim 1, after "signal", insert --,--, therefor Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,483,522 B2
APPLICATION NO. : 13/120544
DATED             : July 9, 2013
INVENTOR(S)      : Heidrich et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this
Eighth Day of September, 2015

Michelle K. Lee
*Director of the United States Patent and Trademark Office*